United States Patent [19]
Lee

[11] Patent Number: 5,478,004
[45] Date of Patent: Dec. 26, 1995

[54] AUTOMATIC SOLDERING APPARATUS

[75] Inventor: Sang-Hong Lee, Suwon, Rep. of Korea

[73] Assignee: Samsung Electronics Co., Ltd., Kyungki, Rep. of Korea

[21] Appl. No.: 309,584

[22] Filed: Sep. 21, 1994

[30] Foreign Application Priority Data

Sep. 22, 1993 [KR] Rep. of Korea ............. 93-19263

[51] Int. Cl.$^6$ .............. B05C 5/02; B23K 3/00; H05K 3/34
[52] U.S. Cl. .................... 228/37; 228/56.2
[58] Field of Search ............. 228/37, 42, 43, 228/219, 56.2; 55/523; 261/122.1; 96/10; 239/145, 553.3, 590.3

[56] References Cited

U.S. PATENT DOCUMENTS

| Re. 33,899 | 4/1992 | Tyer | 261/122.1 |
|---|---|---|---|
| 3,218,193 | 11/1965 | Isaacson | 228/37 |
| 4,039,703 | 8/1977 | Kamijo et al. | 427/183 |
| 4,375,371 | 3/1983 | Tsuchikura | 228/37 |
| 4,684,544 | 8/1987 | Arnett | 228/37 |
| 4,796,558 | 1/1989 | Chartrand et al. | 228/37 |
| 4,934,307 | 6/1990 | Sumiyoshi | 228/43 |

FOREIGN PATENT DOCUMENTS 679450 3/1994 Japan ............ 228/42

Primary Examiner—Samuel M. Heinrich
Attorney, Agent, or Firm—Sughrue, Mion, Zinn, Macpeak & Seas

[57] ABSTRACT

An automatic soldering apparatus and method includes compressed air pipes on both sides of a ceramic foaming tube to prevent through holes of the ceramic foaming tube from being clogged by a foreign substance and to constantly maintain the air pressure within the ceramic foaming tube for uniform dimension of foaming flux and uniform foaming height, thereby performing uniform flux treatment upon a circuit board to eliminate inferiority caused by the foaming flux.

1 Claim, 3 Drawing Sheets

AUTOMATIC SOLDERING APPARATUS

BACKGROUND OF THE INVENTION

1. Field of the Invention

The present invention relates to an automatic soldering apparatus and method for soldering electronic components to a circuit pattern on a circuit board, and more particularly, to an automatic soldering apparatus and method which includes a flux tub with flux therein and a ceramic foaming tube positioned in the flux tub and having compressed air supplied thereto for creating a bubble layer of uniform foaming flux.

2. Description of the Prior Art

In order to carry out a soldering operation upon a circuit board, generally, the leads of electronic components are inserted into holes formed in a circuit pattern on the circuit board, and flux smeared solder is applied and heated and then cooled down to fix the lead of the circuit components to the circuit pattern on the circuit board. However, the soldering operation is a low efficiency operation and workers evade the soldering operation due to the possibility of lead poisoning.

An automatic soldering apparatus developed as an alternate measure is illustrated in FIG. 1. A flux tub 10 is provided to perform a flux treatment upon a circuit board that is passed thereover. A preheating bucket 20 is provided with a heater 22 for drying out and preheating the circuit board that has been subjected to the flux treatment. A soldering tub 26 applies melted solder to the circuit board that has been preheated by the preheating bucket 20, and a cooling tub 30 cools the circuit board after soldering by means of the air flow from a cooling fan 28.

As shown in FIGS. 2 and 3, the flux tub 10 has a trapezoidal chamber 12 therein and a ceramic foaming tube 14 provided in the trapezoidal chamber. The tube 14 has microscopic holes around its circumference and is installed in the lower portion of the flux tub 10. An air supply pipe 16 supplies compressed air to the tube and extends from one side of the ceramic foaming tube 14.

The flux in the flux tub 10 may be any known flux suitable for the soldering application. One known example of the flux is a solvent of 80 wt isopropyl alcohol and 20 wt pine resin. The flux serves in a well known manner to clean that portion of the circuit board to which solder is to be applied in order to facilitate soldering.

Referring back to FIG. 1, the soldering tub 26 has a trapezoidal chamber 32 therein. A laminar flow hovering fan 36, driven by a motor 34, is installed in the lower portion of the soldering tub 26 to push the solder up and over the top of the trapezoidal chamber.

According to the prior art automatic soldering apparatus, when compressed air is forced into the ceramic foaming tube 14 of the flux tub 10 through the compressed air pipe 16, the flux is bubbled and floated as a foaming flux 18 as a result of the action of the compressed air pushing through the holes in the ceramic foaming tube 14, thereby forming a bubble layer. The foaming flux 18 is guided by the chamber 12 to flow outwardly over the edges of the trapezoidal chamber 12 and back into the tub 10. The circuit board to which components are to be soldered, is positioned in the foaming flux and is thereby subjected to a flux treatment.

After being subjected to the flux treatment, the circuit board is transferred to the preheating bucket 20 for the purpose of drying out the foaming flux remaining on the circuit board and preheating the circuit board by the heat generated from the heater 22 within the preheating bucket 20 at a predetermined temperature.

Upon completion of preheating at a predetermined temperature, the circuit board is placed in the laminar flowing solder in chamber 32 of soldering tub 26. The laminar flow hovering fan 36 is rotated below the chamber 32 of the soldering tub 26 by means of the motor 34 to continually cause the solder to flow up and over the edges of the chamber 32. The circuit board contacts the melted lead flowing out of the chamber. The melted lead (solder) solders the leads of the electronic components to the circuit pattern on the circuit board.

When the circuit board that has been fully subjected to the soldering is transferred to the cooling tub 30, the melted lead attached to the pattern of the circuit board and leads of the electronic components are cooled by the air flow generated by the cooling fan 28.

However, in the prior art automatic soldering apparatus, because the compressed air pipe 16 is formed on only one side of the ceramic foaming tube 14 of the flux tub 10, the through holes in the ceramic foaming tube 14 are liable to be locally clogged by foreign substances created within the ceramic foaming tube 14. The clogged through holes vary the pressure within the ceramic foaming tube 14 and, in turn, change dimensions of the foaming flux 18 and the foaming height to surge as waves, so that a circuit board cannot be subjected to a uniform flux treatment.

SUMMARY OF THE INVENTION

The present invention is devised to solve the above-described problems. Accordingly, it is an object of the present invention to provide an automatic soldering apparatus and method, in which compressed air pipes are formed on both sides of a ceramic foaming tube to prevent through holes of the ceramic foaming tube from being clogged by a foreign substance, thereby consistently maintaining pressure within the ceramic foaming tube for obtaining a flux foaming layer of uniform dimension and height, enabling consistent performance of the flux treatment of a circuit board to eliminate inferiority caused by the inconsistent foaming of the flux.

To achieve the above object of the present invention, there is provided an automatic soldering apparatus which includes a flux tub having a trapezoidal chamber therein, a ceramic foaming tube with microscopic through holes along the circumference thereof positioned in the lower portion of the flux tub, and an air supply pipe for supplying compressed air to both sides of the foaming tube for constantly supplying the compressed air under a predetermined pressure.

BRIEF DESCRIPTION OF THE DRAWINGS

The above objects and other advantages of the present invention will become more apparent from the following description of a preferred embodiment thereof in conjunction with the accompanying drawings, where.

DETAILED DESCRIPTION OF THE PREFERRED EMBODIMENT

Figure 4:
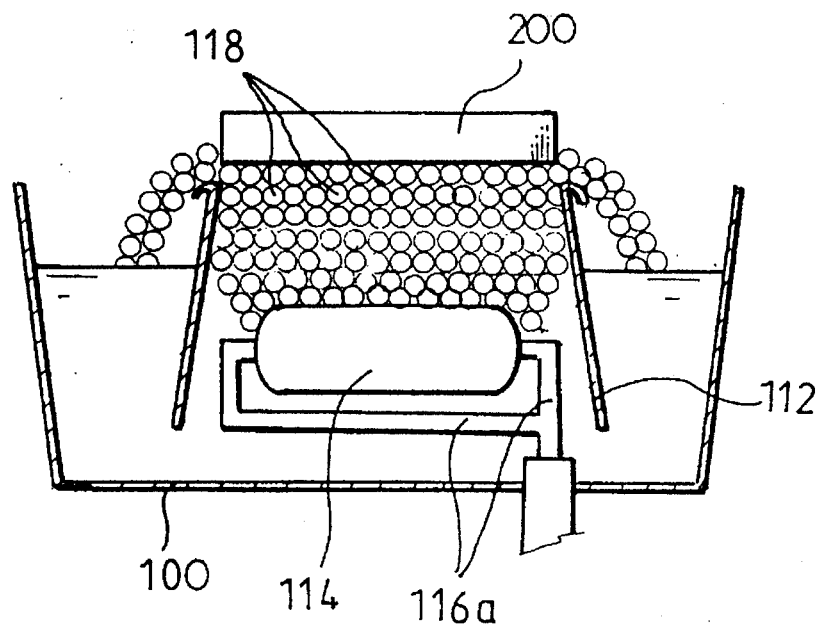
FIG. 4 is a sectional view showing a flux tub for use in the automatic soldering apparatus according to the present invention.
Figure 5:
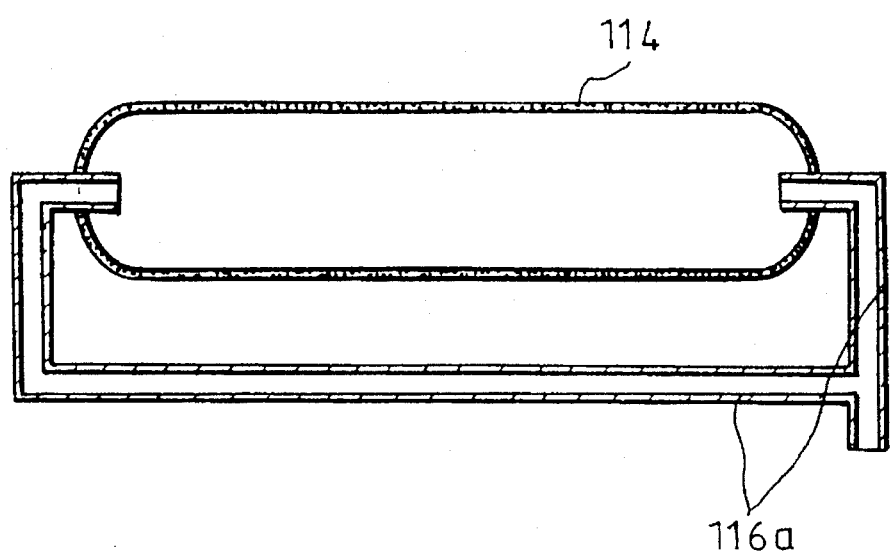
FIG. 5 is a sectional view showing the ceramic foaming tube of FIG. 4.

Referring to FIGS. 4 and 5, a flux tub 100 of an automatic soldering apparatus according to the present invention is installed to perform a flux treatment upon a circuit board 200. A trapezoidal chamber 112 is installed within the flux tub 100, and a ceramic foaming tube 14 having microscopic through holes along its circumference is installed on the lower portion of the flux tub 100. Air supply pipes 116a for supplying compressed air extend from both sides of the ceramic foaming tube 114 toward the center thereof.

The automatic soldering apparatus according to the present invention constructed as above will be described with reference to FIGS. 4 and 5.

First, once the compressed air is injected through the compressed air pipes 116a on both sides of the ceramic foaming tube 114 installed to the flux tub 100, the flux is floated as foaming flux 118 by the compressed air being pushed through the holes in the ceramic foaming tube 114, thereby forming a bubble layer. The foaming flux 118 is guided by the chamber 112 to flow outwardly over the edge of the chamber 112 continuously.

Under this state, the circuit board 200, with the electronic parts inserted therein, is passed over the flux tub 100. The circuit board 200 contacts the foaming flux, whereby the flux treatment is carried out. The compressed air is supplied from both ends of the ceramic foaming tube 114, so that the through holes of the ceramic foaming tube 114 are not clogged and so that uniform pressure is maintained. As a result the foaming layer is uniform and consistent.

Figure 1:
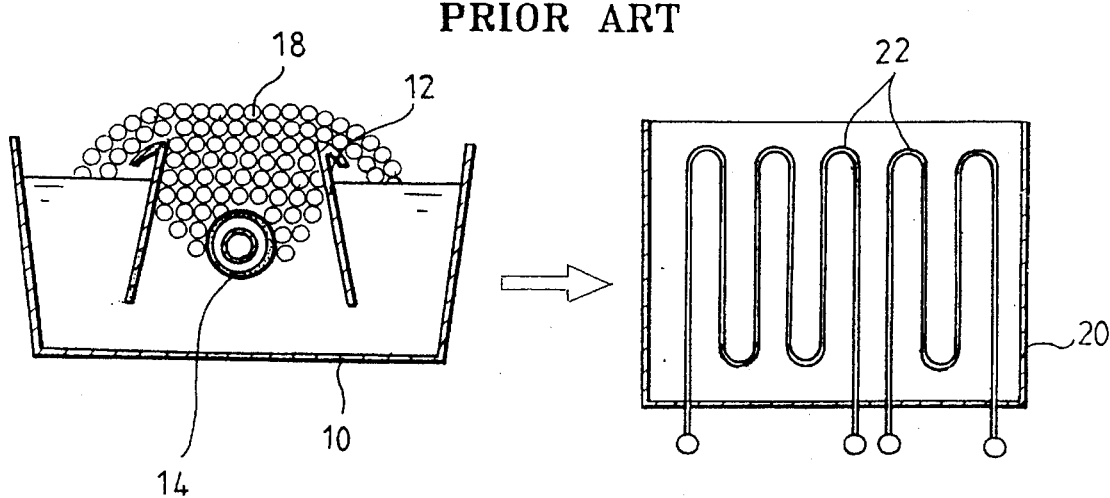
FIG. 1 is a schematic construction view showing a general automatic soldering apparatus and process.
Figure 1:
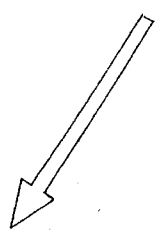
Figure 1:
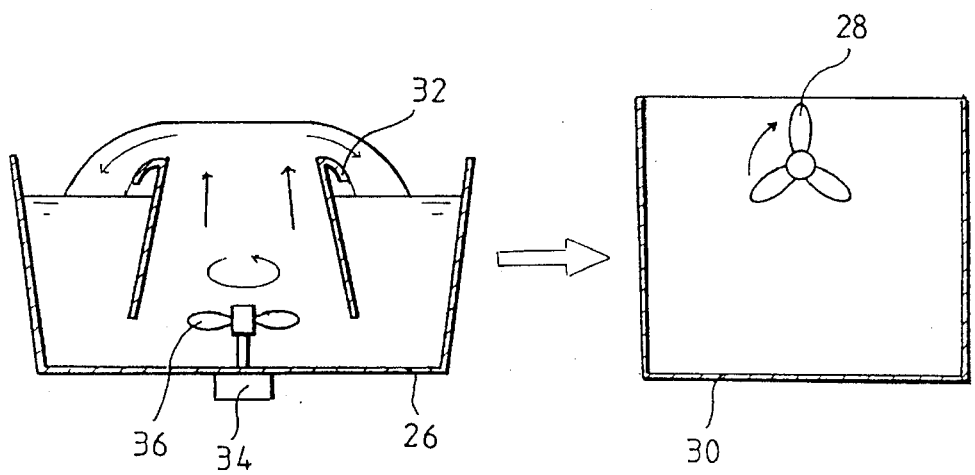
Figure 2:
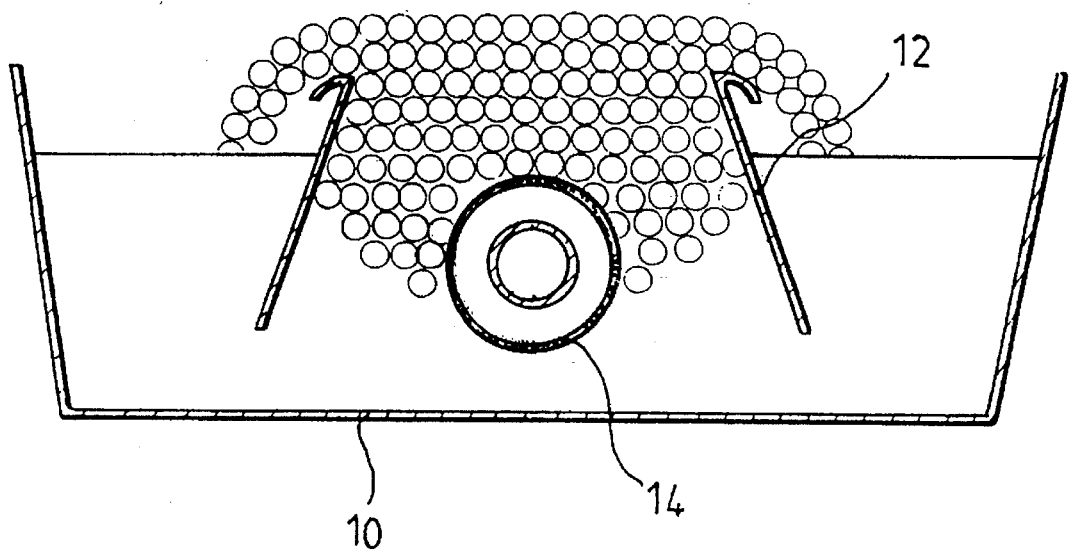
FIG. 2 is a sectional view showing the flux tub of FIG. 1.
Figure 3:
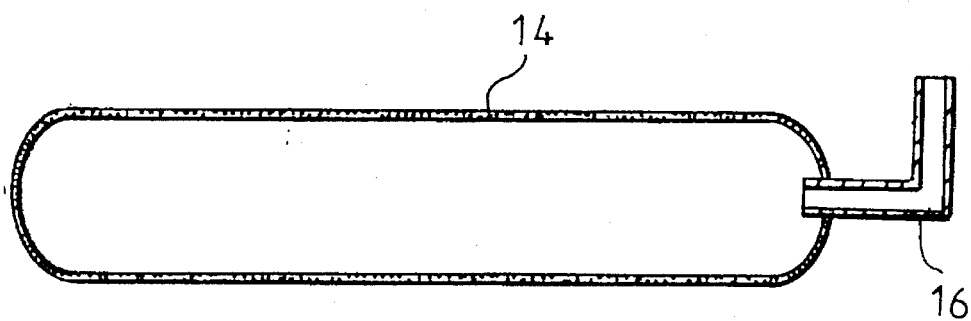
FIG. 3 is a sectional view showing the ceramic foaming tube of FIG. 2.

After being subjected to the flux treatment, the circuit board 200 is transferred to the preheating bucket 20 shown in FIG. 1 to dry out the foaming flux remaining on the circuit board 200 and preheat the circuit board at a predetermined temperature by the heat generated from the heater 22 within the preheating bucket 20.

Upon completion of the preheating operation, the laminar flow hovering fan 36 is rotated below the chamber 32 of the soldering tub 26 by means of the motor 34 to cause the solder to flow over the edges of the chamber 32. The circuit board contacts the melted lead flowing out of the chamber 32 of the soldering tub 26. Thus, by condensation of the melted lead, the pattern of the circuit board 200 is soldered to the leads of the electronic components.

When the circuit board 200 has been fully subjected to the soldering, it is transferred to the cooling tub 30, where the melted lead attached to the pattern of the circuit board 200 and leads of the electronic parts is cooled to be fixed by means of air flow generated by the cooling fan 28.

In the automatic soldering apparatus according to the present invention, compressed air is supplied from both ends of the ceramic foaming tube 114. Consequently, as compared with the conventional technique for supplying compressed air from one side of the ceramic foaming tube, the through holes in the ceramic foaming tube 114 are less likely to be clogged by a foreign substance created within the ceramic foaming tube 114. In turn, the dimension of the foaming flux 118 and the foaming height are consistently formed, and uniform flux treatment is completely performed on the whole surface of the circuit board 200 to eliminate inferiority of the circuit board 200 caused by the foaming flux 118.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An automatic soldering apparatus comprising a flux tub having a trapezoidal chamber therein, a ceramic foaming tube with microscopic through holes along the circumference thereof positioned in said chamber at a lower portion of said flux tub, and an air supply pipe extending from both ends of said ceramic foaming tube for supplying compressed air to said ceramic foaming tube.

* * * * *